Dec. 25, 1962 S. N. BLACKMAN ETAL 3,069,810
ABRASIVE TOOL
Filed May 22, 1959 3 Sheets-Sheet 1
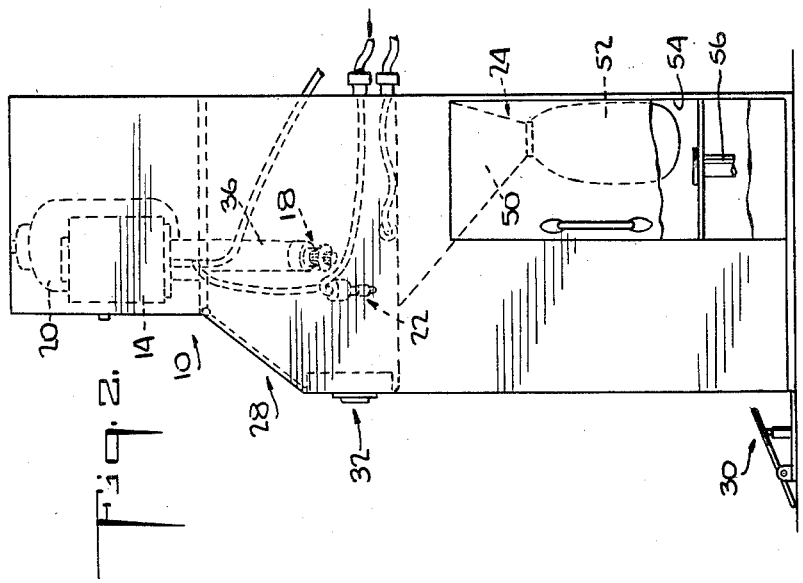
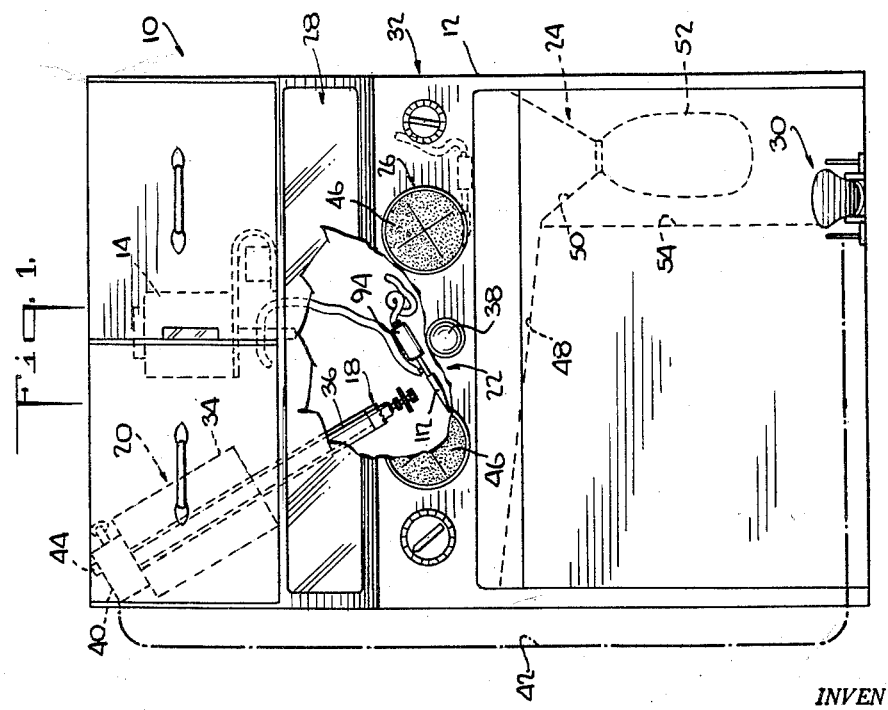
INVENTORS
SEYMOUR N. BLACKMAN
HENRY C. PELTIER
BY
ATTORNEYS

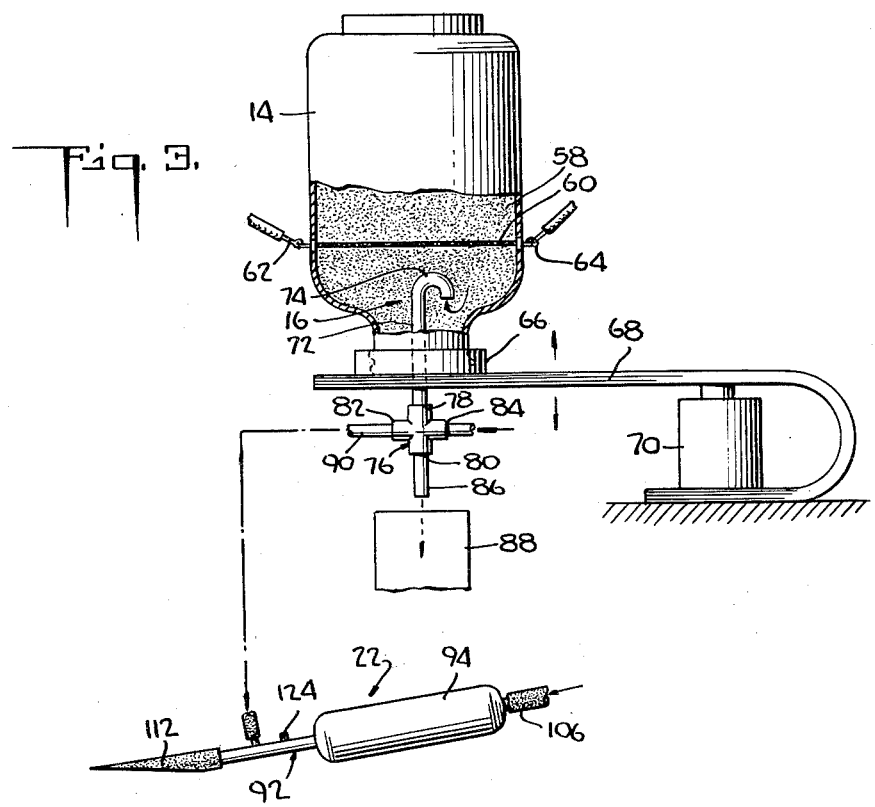
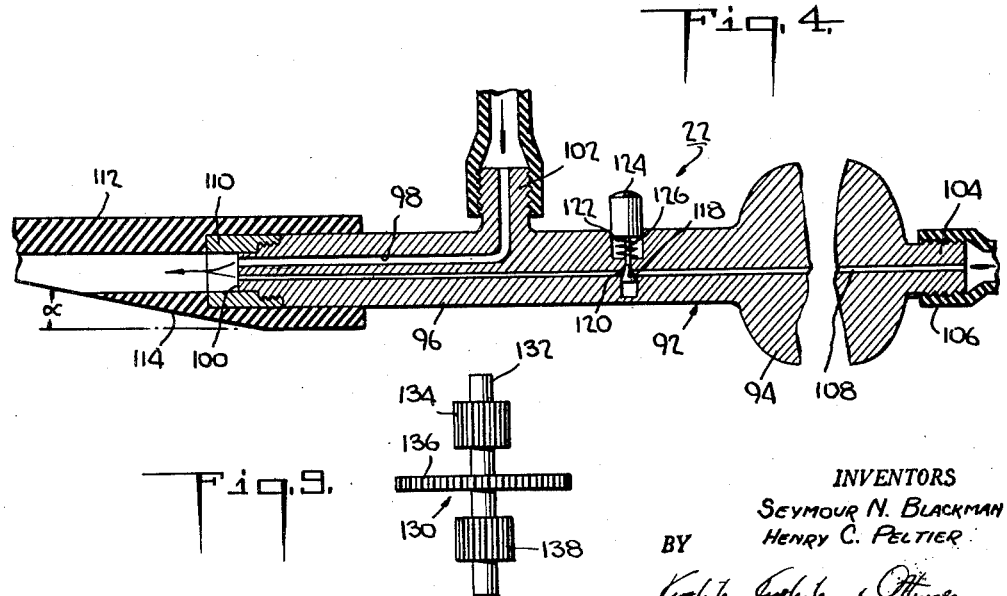

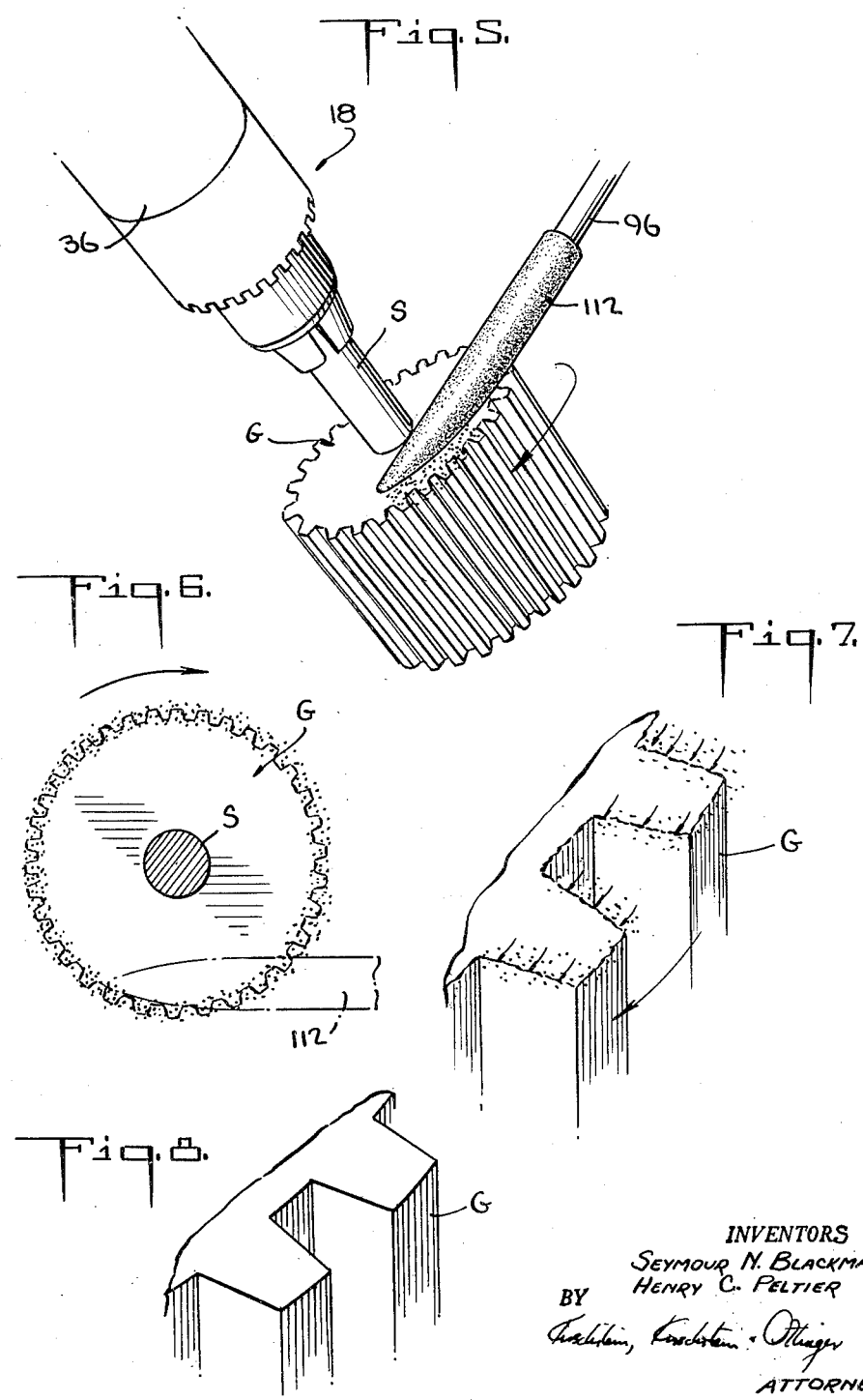

United States Patent Office 3,069,810
Patented Dec. 25, 1962

3,069,810
ABRASIVE TOOL
Seymour N. Blackman, Teaneck, and Henry C. Peltier, Hackensack, N.J., assignors, by mesne assignments, to American Technical Machinery Corp.
Filed May 22, 1959, Ser. No. 815,165
1 Claim. (Cl. 51—8)

This invention relates to an apparatus and method for the delicate and precise abrasive removal of metal. In the specific example of the invention to be described hereinafter in detail, it has been shown as embodied in a gear deburring machine; however, it should be understood that the invention is not to be thus limited except to the extent indicated in the appended claim.

High precision gears, and in particular high precision gears which are designed to be run in clusters with the broad sides of pairs of meshing gears in extremely close juxtaposition, are required to have dead flat (as low as ±0.000020 inch) side faces. As the teeth of such gears are formed by a metal removing operation, e.g. hobbing, milling, shaping or grinding, the lateral pressure of the tool induces cold flow of the metal. This is unnoticeable over the major portion of the flank and top of each tooth since the body of the tooth inhibits flow. But adjacent the side of the tooth no such restraint exists so that at the exit edges cold flow creates an irregular burr along the entire profile. These burrs make a gear unacceptable for high precision work inasmhch as they prevent placing the gears in close proximity and tend to form chips that may fall between meshing gears and cause early failure.

In run-of-the-mill gears the burrs can be removed by an easily practiced filing operation, grinding, wire-brushing, sandblasting, or tumbling, but these procedures do not readily lend themselves to deburring of high precision gears. Manual filing of the burrs is an extremely tedious operation since the burrs must be accurately and carefully filed off bit by bit along the profile of each tooth. The minuteness and close spacing of the teeth customarily utilized in high precision work enormously complicates the task. Since the teeth are so small and the deburring must be so clean and exact it is necessary to effect it under a magnifying glass or low power microscope. The cost of a typical small high precision gear may be $240 of which about $40 may be the expense for manual deburring. Despite these drawbacks, high precision gears currently and for some time past, have been deburred by hand filing.

It has been proposed to deburr gears by sandblasting and the like but this has proved impractical. At the high particle speeds employed in sandblasting, commercial grits tend to impregnate (become embedded in the metal of) the gears. The contaminating particles work loose in operation where, under the circumstances of use of high precision gears, to wit almost non-existant tooth tolerances and intergear clearances, they cause destructive wear. Moreover, in a sandblasting operation, the particles cut comparatively deep furrows in the sides of the teeth which interfere with free running of the gears. Still further, the particles of grit tend to contaminate the teeth, i.e. cling to the teeth so tenaciously that they are almost impossible to remove. These particles would not damage an ordinary gear, but they are intolerable in high precision gears.

Deburring of gears by tumbling is subject to the defects of sandblast deburring, and additionally, to the uncontrolled eroding of the flanks. Grinding and wire-brushing likewise contaminate and impregnate the teeth and, furthermore, raise secondary burrs.

It is an object of the present invention to provide a method and apparatus which will deburr gears without being subject to any of the foregoing drawbacks.

More particularly, it is an object of the invention to provide an improved sandblasting method and apparatus which will impregnate, contaminate or furrow the gears, and will enable the shapes of the flanks, i.e., the profiles, to be maintained without change.

As noted above, in high precision gears, it is desirable to have substantially flat sides on the gears in order to locate the gears dead square for precision hobbing operations, tooth indexing and spacing checks, as well as to enable close paralleling to be obtained in a gear box. Heretofore, it has been proposed to deburr gears with a sandblasting tool that operated against a side of a gear during the deburring operation. But the corners, edges and faces of this tool cut sub-visual, and sometimes visual, furrows. The height of the metal raised from the furrow often exceeded the permissible variation for the desired plane finish. It is another object of the present invention to provide a method and apparatus of the character described which enables the deburring to be effected by grid blasting without scratching the side faces of gears and raising such furrows.

It is another object of the invention to provide an abrasive method and apparatus of the character described which will permit an operator to rub the abrading tool on the object being treated without destroying a superfine finish of the same.

It is another object of the invention to provide an abrasive cutting method and apparatus in which the usual rapid wear of the parts (the fittings and conduits) which contain the abrasive stream is very greatly reduced.

It is another object of the invention to provide an improved arrangement for inducing the flow of abrasive grit from a container to a gaseous stream that carries the grit to a point of application.

It is another object of the invention to provide a method and apparatus of the character described which can abrasively deburr awkwardly located portions of metal bodies, as, for instance, the sides of gear teeth which are close to, e.g. ¼" away from, a larger coaxial gear.

It is another object of the invention to provide a method and apparatus of the character described which substantially limit the deburring action to the plane of the side faces of the gear teeth even when the cutting nozzle is not held parallel to the face of the gear.

Other objects of the invention in part will be obvious and in part will be pointed out hereinafter.

The invention accordingly consists in the features of construction, combinations of elements, arrangements of parts and series of steps which will be exemplified in the construction and process hereinafter described and of which the scope of application will be indicated in the appended claim.

In the accompanying drawing, in which is shown one of the various possible aspects of the invention, FIG. 1 is a front view of an abrasive cutting machine constructed in accordance with the present invention and partly broken away to show certain important components.

FIG. 2 is a side elevational view of the machine shown in FIG. 1.

FIG. 3 is a front elevational, enlarged, partially sectional and partially diagrammatic view of the grit circuit.

FIG. 4 is a longitudinal central sectional fragmentary view of the grit gun.

FIG. 5 is a highly enlarged perspective view of the chuck and nozzle tip during a deburring operation.

FIG. 6 is an end view of a gear during the deburring operation.

FIG. 7 is a more greatly enlarged perspective view of a fragment of the rim of the gear during the deburring operation.

FIG. 8 is a view similar to FIG. 7, but showing the gear after deburring; and

FIG. 9 is a plan view of a gear set showing certain gears which heretofore have been difficult to debur, but which can be handled with great ease by the instant invention.

Referring now in detail to the drawings, the reference numeral 10 denotes an abrasive cutting machine constructed in accordance with the present invention and particularly adapted to debur gears. More specifically the machine has been specially designed to debur high precision gears. As a rule, these gears have a rather slight thickness, e.g. 0.04", and a correspondingly small depth (radial length). It should be emphasized that the foregoing measurement simply is exemplificative and is not to be taken by way of limitation. The gears to be deburred will be provided with various types of side finishes. Some gears require a superfine finish, e.g. a side face tolerance as minute as 2 microinches. Said gears frequently have an integral shaft or hub and in the operation of the machine 10 the gear is gripped by said shaft or hub, it being understood that if the gear does not include a shaft or hub, it is customary temporarily to provide suitable means for enabling the gear to be held during deburring.

The machine 10 includes an external casing 12 which houses the various necessary components. Within the casing are a grit container 14, a mechanism 16 for transporting grit from the container to a conduit in which the grit is gas borne to a grit gun, a chuck 18, a mechanism 20 for spinning the holder, a grit gun 22 and a grit collector 24. The casing also preferably includes protected hand ports 26, a view port 28, a control switch 30, and sundry regulators 32. The casing may include several indicators, i.e. voltage and pressure meters, which have been omitted from the drawings to simplify illustration.

The chuck 18 is entirely conventional. It includes the usual hollow sleeve having a tapering forward end within which three or more gripping jaws are axially translatable so that upon forward movement of the jaws they will converge toward a common center, and upon rearward movement will diverge. Inasmuch as such holders are standard the chuck will not further be described except to say that it is pneumatically operated, e.g. by compressed air. The chuck is controlled either to open or to close the jaws thereof by the foot switch 30. The pneumatic circuit is arranged, as is well-known, so that stepping on the foot switch will close the chuck and releasing pressure on the foot switch will open the chuck.

The mechanism 20 for spinning the chuck constitutes a reversible variable speed motor 34 connected by a hollow shaft 36 to the chuck. The speed and direction of the motor is controlled by a rheostat having a manually manipulatable knob 38 on the front of the casing 10.

For convenience, the chuck 18 is opened and closed by an air piston 40 mounted on the back end of the motor. Said piston axially shifts a control rod that extends from the piston through the hollow shaft 36 to the chuck for opening and closing the jaws thereof. As noted previously, the foot switch 30 controls the chuck position this being accomplished through an airline 42 and the air piston 40.

The motor 34 is turned in either direction by manipulation of the knob 38. However, to prevent inadvertent starting of the motor, a safety switch 44 is mounted on the air piston cylinder. This switch has a pair of normally open contacts in the motor circuit which contacts are closed by the air piston when it moves to a position wherein the jaws of the chuck grasp a gear. Such an arrangement ensures closure of the chuck before the motor will start.

For reasons which later will be apparent, it is desirable to permit manual access to the inside of the casing 12 when the apparatus is in operation, and to this end the hand ports 26 are located at the front of the casing at about the height of an operator's elbows. Said hand ports are spaced apart a distance comfortable for an operator, being located on opposite sides of the chuck 18, the latter being positioned at about the level of the hand ports. To minimize the amount of grit which may seep into the room, the hand ports are covered with flexible discs 46, e.g. rubber sheets, which are cross-slitted as indicated to allow ready entry of an operator's forearms.

The grit collector 24 is conventional. It includes a trough 48 beneath the chuck 18 and sloping to a sump 50 that terminates in a discharge opening leading to an air-permeable bag 52. The bag is disposed in an internal compartment 54 the pressure of which is maintained below atmospheric by a conduit 56 that is connected to the suction inlet of an air pump. This arrangement maintains it below atmospheric pressure throughout the interior of the machine whereby to prevent seepage of the grit into the room.

The reference numeral 58 denotes a supply of grit within the container 14. In accordance with the present invention and as the first feature thereof to be described in detail herein the grit is garnet dust. Such a dust now has been found to have special properties in connection with use as an abrasive cutting medium borne in a gaseous stream. When so handled it has been found that the garnet particles neither impregnate nor contaminate metal bodies. Therefore, when such a grit borne in a gaseous cutting stream is impinged on a gear for deburring the same, the gear will not when thereafter used be deteriorated by the freeing of grit particles.

The garnet dust preferably is from about 1 to 120 microns in diameter, this having been found to be most effective in deburring of gears. Although garnet is a well-known substance, an example of a typical garnet is given herein by way of illustration and without limitation. Such a garnet includes a combination of almandite $[F_2Al_2(Si_4O_3)]$ and pyrope $[Mg_2Al_2(SiO_4)_3]$ in such proportions that there is a predominant amount of silicon dioxide, a substantial but lesser amount of aluminum oxide, approximately equal but still lesser amounts of magnesium oxide and ferric oxide, a still lesser amount of ferrous oxide and relatively small amounts of calcium oxide and manganese oxide.

An exemplificative chemical analysis of a suitable garnet for effecting the instant invention is:

| | Percent |
|---|---|
| Silicon dioxide ($SiO_2$) | 41.34 |
| Ferrous oxide (FeO) | 9.72 |
| Ferric oxide ($Fe_2O_3$) | 12.55 |
| Aluminum oxide ($Al_2O_3$) | 20.36 |
| Calcium oxide (CaO) | 2.97 |
| Magnesium oxide (MgO) | 12.35 |
| Manganese oxide (MnO) | .85 |
| | 100.14 |

The hardness of this garnet is between 8 and 9 on the Mohs' scale. It is friable to tough in strength but in the small particle size alluded to its friability is barely noticed. It fractures at sharp angular, irregular, planes of cleavage. In color it varies from red to pink and if examined before reduction to the indicated small particle size it will be seen to be streaked with white and translucent. Before reduction to grit it has a specific gravity varying from 3.9 to 4.1 and a mean refractive index of 1.83. Its facet angles are 37° P. and 42° P. It crystallizes in the cubic (isometric) system as rhombic dodecahedrons or tetragonal trisoctahedrons (trapezohedrons) or in combinations of the two. The melting point of the garnet is 1315° C. It is non-hydroscopic and inert. This particular garnet is obtained from an Adirondack deposit.

The container 14 may be opaque or transparent, the latter being more convenient since it enables the amount of the dust left to be more readily ascertained. The top of the container preferably is open for ease of filling.

The best results are obtained when the garnet dust is heating before cutting. It has been found that heating garnet greatly increases cutting efficiency without detracting from its non-impregnating and non-contaminating qualities. The heating can be carried out in a separate step before loading the dust into the container 14. Nevertheless it is more convenient to perform heating within the apparatus 10 and for this purpose an electric heater 60 is horizontally disposed in the container 14 a short distance above and across its bottom. The heater constitutes a "Nichrome" wire screen energized by a pair of power leads 62, 64 whereby all of the garnet dust that ultimately is fed into the cutting stream first is properly heated.

When the dust is heated outside the receptacle it has been found that baking at about 300° F. or higher for at least one hour will secure the desired increased cutting efficiency. When heated within the receptacle the desired increased cutting efficiency is obtained if the screen 60 is run at about at least a cherry red heat. A suitable size of screen is one with openings of about 0.04" to a side.

The lower mouth of the container is screwed into a recessed stand 66 mounted on a J-shaped leaf spring 68. The two arms of the spring are attached to one another near the retroverted bend thereof by a vibrator 70, for instance a "Syntron," which agitates the container so as to keep the garnet dust in constant movement and thereby encourages its flow through a vertical discharge tube 72 that passes downward through the stand 66.

Heretofore, it has been the practice in abrasive cutting to terminate the upper end of a discharge tube at a horizontal upwardly facing inlet opening and simply to permit grit particles gradually to fall therethrough. Such construction never has been particularly satisfactory because the tiny grit particles tend to compact and bridge over said opening. The arch of particles repeatedly is broken by the vibration of the container to discharge some particles into the tube. However, this results in an uneven outflow of particles. Such difficulty has been overcome by a feature of the present invention pursuant to which the upper end of the discharge tube is shaped like a cane, i.e. is provided with a retroverted bend 74, the intake opening whereof faces downwardly rather than upwardly as heretofore. The rise of the bend above the intake is comparatively slight, a ¼" being typical for the rise of the center line. It has been discovered that with such an arrangement the grit particles literally dance their way up and around the bend in a steady continuous trickle. After turning the bend the grit particles fall down the discharge tube.

Until the present invention the grit particles descending through the discharge tube 72 were entrained in a suitable manner, for example, by a simple suction feed or a form of aspirator, into a high pressure moving gaseous stream, said particles being suspended in the stream due to the agitation and comparatively rapid movement of the stream. However, such an arrangement has been found to have serious drawbacks, particularly where the high pressure stream is of small diameter as in the case of abrasive cutting apparatuses. Each time that the abrasive filled gas stream experienced a change in its flow the gas borne cutting particles rapidly eroded the walls of the conduit, fitting, gun or nozzle and, moreover, the particles lost their keen cutting edges before reaching their point of intended use.

The present invention in part includes constructing the apparatus 10 in such a fashion that the foregoing drawback is avoided. More particularly, in the instant machine gas borne cutting particles are transferred to the point of cutting by a low pressure air stream that is maintained separate from the high pressure gas stream until both streams have left the nozzle of the cutting gun. Thus referring to FIG. 3 it will be seen that the discharge tube 72 runs to a four-way cross-fitting 76, having vertically aligned openings 78, 80, and horizontally aligned openings 82, 84. The lower end of the discharge tube is connected to the opening 78. A vertical tube 86 has its upper end connected to the opening 80 and its lower end above a grit collector 88. One of the horizontally aligned openings, e.g. the opening 84, is open to the atmosphere. The other horizontal opening 82 is connected to a feed tube 90. For reasons which soon will be apparent the feed tube 90 is maintained at a somewhat below atmospheric pressure. Accordingly, there is a horizontal flow of air through the fitting 76 from the opening 84 to the opening 82. This flow crosses the vertical path of the trickle discharge of grit particles from the container 14 and is sufficiently rapid to induce a drift of grit particles into the feed tube 90 in an amount which has been found sufficient when subsequently accelerated to a high velocity to induce a useful cutting action. The particles not entrained in the horizontal air stream that crosses the grit trickle drop into the collector 88.

The grit gun 22 combines the low pressure air stream having the entrained grit particles with a high pressure gas stream to accelerate the travel of the grit particles to a speed at which they will perform a cutting operation on metal. To this end the gun comprises a body 92 including a handle 94 adapted to be gripped by an operator. Projecting forwardly from the handle is an extension 96 including a longitudinal bore 98 that terminates at the front face 100 of the said extension. The rear end of the bore 98 turns upwardly to pass through an externally corrugated stud 102. The feed tube 90 which preferably is flexible being made, for instance, from rubber or a vinyl polymer is coupled to the stud so as to lead the low pressure air stream with entrained particles of grit to the bore 98.

The body 92 further includes a second externally corrugated stud 104 coupled to a second flexible feed tube 106. The latter runs to a source of high pressure gas. Desirably, in order to maintain a dry cutting stream, the source of gas is bottled thereby permitting the utilization of anhydrous gas. Although bottled air can be used, better results have been secured where the compressed gas is inert, e.g. nitrogen. The gas flowing through the tube 106 is at a high pressure, a suitable pressure, for instance, being in the range of 100 to 3000 lbs. per sq. in. A bore 108 extends from the stud 104 to the front face 100 of the extension 96 terminating immediately adjacent the termination of the bore 98. The high pressure gas issuing from the bore 108 will induce a low pressure area at the adjacent terminus of the bore 98 thus creating a flow of air through this bore, i.e. aspirating a flow of gas through said bore. The low pressure air with its entrained grit will mix with the high pressure gas in the turbulent area that is in front of the ends of the two bores and from this point forward the grit is propelled at a speed sufficiently high for cutting. Optionally, to aid in directing the flow of high velocity grit, the extension 96 has screwed on its free end a tubular tip 110 of a wear resistant material such as silicon carbide.

It will be observed that said tip 110 (see FIG. 4) is quite short and that the length thereof exposed to the moving stream of grit has a ratio with respect to the bore diameter which is relatively small, that is to say, about 1:1, this arrangement being deliberately selected to minimize the extent of hard surface area against which the grit can rub in order to reduce wear on the tip and, more importantly, to minimize wear of the grit so that when the grit subsequently is played upon metal parts to be cut, it is still in fresh and sharp state, and is able to cut with maximum efficiency.

Nevertheless, it is preferable to guide the grit stream for a greater distance than that afforded by the silicon carbide tip 110. To do this without wearing down the sharp cutting edges of the grit we additionally include on the gun a tubular sleeve 112 the rear end of which snugly fits around the tip 110 as well as the front end of the extension 96. The sleeve 112 is considerably longer than the tip 110 and instead of being formed from hard material is fabricated from an elastomer, e.g., a natural or synthetic rubber or a polyvinyl synthetic plastic. The bore of the sleeve coincides and is in registry with the bore of the tip 110. In this manner we ensure that the flowing airborne stream of grit particles have a well defined path of travel and yet the particles are not subjected to the dulling contact of an extensive hard surface.

The sleeve 112 has a further and more important function, to wit, enabling the operative zone of the gun to be in direct rubbing contact with the metal surfaces which are to be cut, e.g., deburred, by the high velocity grit particles. Such very close contact permits the operator to place the emerging cutting stream against the article being treated without scratching such article and thereby marring its finish. In particular, this arrangement renders the tool capable of working on highly finished metal surfaces without scratching the same, while minimizing turbulent flow of the grit that would reduce velocity and lessen cutting ability. In the application of the tool herein being described, to wit, deburring of gears, said arrangement allows the operative zone of the tool to be rubbed flatly against the burred side of the gear. Such rubbing contact tactilely conveys to the operator the vibrations which represent the passage of burrs beneath the sleeve and thereby advise the operator without visual inspection when the burrs have been removed.

Desirably, the elastomeric sleeve is acutely terminated; that is to say, the tip has an outer operating end which lies in a plane making a sharp angle with the longitudinal axis of the sleeve. In a preferred form of our invention, this angle is as small as 5° to 10°, the angle having been somewhat exaggerated in FIG. 4 for purposes of illustration. This small angle creates a functionally useful orientation between the plane of the face of the gear being deburred and the axis of the moving grit stream so that the grit approaches the burrs at approximately 90° to the height of the burr whereby the grit stream plays perpendicularly against the roots of the burrs and cuts them cleanly from the gear teeth.

In the operation of the machine 10, the gear being deburred in rotating and a tendency thereby is created to deflect the motion of the rapidly moving grit particles into a plane which is parallel to the face of the gear being deburred. It is believed that this deflection may in part be due to a windmilling action; that is to say, as the gear turns it tends to set up air motion at the side of the gear in a plane parallel to such side, and this moving stream of air is thought to lessen the angle of the grit stream with respect to the face of the gear. We have found that with such rotation the grit stream does not noticeably penetrate the spaces between the gears to cut into the gear blanks.

The machine is readied for operation by applying high pressure gas to the flexible feed tube 106 and energizing the vibrator 70. This readies the gun 22 for use. A gear, such as for instance the gear G (FIG. 5), has its shaft S engaged by the chuck 18. The motor 34 then is energized to spin the gear. The knob 38 is turned to regulate the rotation of the gear to a speed at which its tooth cannot be seen. A suitable rate of revolution is about 600 r.p.m. for an average small gear.

The operator holds the gun through the ports 26, placing the oblique face 114 of the elastomeric sleeve 112 flat against the face of the gear. The sleeve is oriented so that the point thereof faces in the direction of rotation of the gear. At this time the operator can feel the fine vibrations caused by passage of the burrs under the sleeve. The operator will later be able to recognize immediately the difference between these vibrations and the heavier vibrations caused by engagement of the teeth with said sleeve when the burrs have been cut off. To simplify the control of high pressure gas, we provide a valve 116 in the gun 22. Said valve includes a conical seat 118 which interrupts the bore 108. A valve plug 120 is urged into closing contact with the seat by a spring 122. The valve is regulated by a button 124 connected to the plug by a spindle 126 and accessible on the outside of the gun.

In FIG. 9 we have illustrated a conventional gear 130 having a construction such that until the advent of the present invention the deburring thereof was extremely difficult. Said gear has on a common shaft 132 three pinions 134, 136, 138. It has been almost impossible to deburr the inner faces of the pinions 134, 138 since they are blocked by the larger central pinion 136. But with the use of our invention the elastomeric sleeve 112 can easily be inserted in the space between the large pinion and either small pinion and be arranged to bear on the difficultly accessible inner face of either small pinion.

It thus will be seen that we have provided an apparatus and method which achieve all the objects of our invention and are well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described our invention, we claim as new and desire to secure by Letters Patent:

An abrasive tool, comprising a container for enclosing a predetermined quantity of an abrasive grit material, a gun having two separate and independent passageways terminating at one end of said gun, a flexible feed tube connected between said container and said gun for conveying said abrasive grit under relatively low pressure to a first of said passageways, the second of said passageways being adapted to receive a supply of a gaseous stream under relatively high pressure, whereby the grit and gaseous stream are transferred independently to the exterior of said gun, a pipe extending into said container from the exterior thereof having a grit ingress end within said container and an egress end on the exterior of said container, the ingress end within said container being positioned to be in contact with grit abrasive material when said material is placed in said container, a coupler element having four coupling passageways in communication with each other, said egress end of said pipe being connected to one passageway of said coupler, the end of said flexible feed tube furthermost from said gun being connected to a second passageway of said coupler element, a third passageway of said coupler element being opened to the atmosphere, a fourth passageway of said coupler elements being connected to a grit collector for receiving particles of said grit abrasive material that are not delivered to said first passageway in said gun, said passageway which is connected to said flexible tube being substantially opposite said passageway which is opened to atmosphere, said passageway which is connected to the egress end of said pipe being substantially above and opposite said passageway which is connected to said collector, whereby the gas admitted from said second passageway in said gun induces a flow of air into said coupler element picking up abrasive grit material for delivery through said flexible tube and through said second passageway in said gun.

References Cited in the file of this patent

UNITED STATES PATENTS

| | | |
|---|---|---|
| 1,980,432 | Power | Nov. 13, 1934 |
| 2,107,084 | Pletcher | Feb. 1, 1938 |
| 2,272,686 | McGibbon | Feb. 10, 1942 |

(Other references on following page)

UNITED STATES PATENTS

| | | |
|---|---|---|
| 2,347,998 | Drummond | May 2, 1944 |
| 2,376,287 | Sorrentino | May 15, 1945 |
| 2,378,399 | Fruth | June 19, 1945 |
| 2,407,642 | Ashworth | Sept. 17, 1946 |
| 2,422,431 | Melrose | June 17, 1947 |
| 2,440,334 | Gerlach | Apr. 27, 1948 |
| 2,576,008 | Gladfelter | Nov. 20, 1951 |
| 2,653,420 | Ruth | Sept. 29, 1953 |
| 2,669,809 | McGrath | Feb. 23, 1954 |
| 2,744,361 | Larson et al. | May 8, 1956 |
| 2,759,266 | Cassani | Aug. 21, 1956 |
| 2,766,558 | Black | Oct. 16, 1956 |
| 2,830,884 | Smiley | Apr. 15, 1958 |
| 2,941,861 | Wentorf | June 21, 1960 |